(12) United States Patent
Burks, III et al.

(10) Patent No.: US 7,818,622 B2
(45) Date of Patent: Oct. 19, 2010

(54) METHOD FOR RECOVERING DATA PROCESSING SYSTEM FAILURES

(75) Inventors: Thomas V. Burks, III, Austin, TX (US);
Mike C. Duron, Pflugerville, TX (US);
Mark D. McLaughlin, Austin, TX (US);
Meghna Paruthi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/111,759

(22) Filed: Apr. 29, 2008

(65) Prior Publication Data

US 2009/0271602 A1 Oct. 29, 2009

(51) Int. Cl.
*G06F 11/00* (2006.01)

(52) U.S. Cl. .......................... 714/36; 713/2

(58) Field of Classification Search .............. 714/36; 713/2
See application file for complete search history.

(56) References Cited

U.S. PATENT DOCUMENTS

| | | | |
|---|---|---|---|
| 6,170,055 B1 * | 1/2001 | Meyer et al. .................. | 713/2 |
| 6,381,694 B1 * | 4/2002 | Yen ................................ | 713/2 |
| 6,473,857 B1 * | 10/2002 | Panas et al. .................... | 713/2 |
| 6,931,522 B1 * | 8/2005 | Raghavan et al. ............. | 713/2 |
| 6,934,805 B2 | 8/2005 | Hickman et al. | |
| 7,043,664 B1 * | 5/2006 | Chiloyan ....................... | 714/5 |
| 7,100,087 B2 | 8/2006 | Yang et al. | |
| 7,185,191 B2 | 2/2007 | Bosley et al. | |
| 7,206,971 B2 * | 4/2007 | Zeller et al. .................... | 714/36 |
| 7,219,261 B2 * | 5/2007 | Tada et al. ..................... | 714/15 |
| 7,234,051 B2 * | 6/2007 | Munguia et al. ............... | 713/2 |
| 7,266,727 B2 * | 9/2007 | Crowell et al. ................ | 714/36 |
| 7,308,609 B2 * | 12/2007 | Dickenson et al. ............ | 714/36 |
| 7,346,809 B2 * | 3/2008 | Blanchard et al. ............. | 714/37 |
| 7,376,944 B2 * | 5/2008 | Crisan et al. .................. | 717/171 |
| 7,536,598 B2 * | 5/2009 | Largman et al. ............... | 714/36 |
| 2002/0147941 A1 * | 10/2002 | Gentile ......................... | 714/36 |
| 2004/0199825 A1 * | 10/2004 | Zeller et al. ................... | 714/36 |
| 2005/0229173 A1 | 10/2005 | Mihm et al. | |
| 2005/0273588 A1 * | 12/2005 | Ong et al. ...................... | 713/2 |
| 2006/0041739 A1 * | 2/2006 | Iwakura et al. ................ | 713/2 |
| 2006/0225067 A1 | 10/2006 | Yang | |
| 2007/0033387 A1 * | 2/2007 | Arnez et al. ................... | 713/1 |
| 2008/0052507 A1 * | 2/2008 | Chow et al. ................... | 713/2 |

* cited by examiner

*Primary Examiner*—Marc Duncan
(74) *Attorney, Agent, or Firm*—Dillon & Yudell LLP

(57) ABSTRACT

A method for recovering from software and/or hardware failures occurred in a data processing system is disclosed. A current version of boot code and an updated version of boot code are stored in a first memory region and a second memory region, respectively, of a non-volatile memory of the data processing system. The updated version of boot code is periodically replaced by a latest version of boot code downloaded from a support center. After an occurrence of a system crash, a determination is made if the system crash was caused by a known problem that can be remedied by the updated version of boot code. If so, the data processing system is rebooted using the updated version of boot code. Otherwise, data related to the system crash is collected, and the data processing system is rebooted using the current version of boot code.

9 Claims, 2 Drawing Sheets

METHOD FOR RECOVERING DATA PROCESSING SYSTEM FAILURES

BACKGROUND OF THE INVENTION

1. Technical Field

The present invention relates to data processing systems in general, and in particular to failure recovery techniques in data processing systems. Still more particularly, the present invention relates to a method for recovering from software and/or hardware failures occurred in a data processing system.

2. Description of Related Art

During a course of operation, a data processing system may experience various failures that are caused by problems in software and/or hardware components. The present disclosure provides an improved method for recovering from software and/or hardware failures occurred in a data processing system.

SUMMARY OF THE INVENTION

In accordance with a preferred embodiment of the present invention, a current version of boot code is stored in a first memory region of a non-volatile memory of a data processing system, and an updated version of boot code is stored in a second memory region of the non-volatile memory of the data processing system. The updated version of boot code is periodically replaced by a latest version of boot code downloaded from a server located within a support center.

After an occurrence of a system crash, a determination is made whether or not the system crash was caused by a known problem that can be remedied by the updated version of boot code. If the system crash was caused by a known problem that can be remedied by the updated version of boot code, the data processing system is rebooted using the updated version of boot code stored in the second memory region of the non-volatile memory. However, if the system crash was not caused by a known problem that can be remedied by the updated version of boot code, data related to the system crash are collected, and the data processing system is rebooted using the current version of boot code stored in the first memory region of the non-volatile memory.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
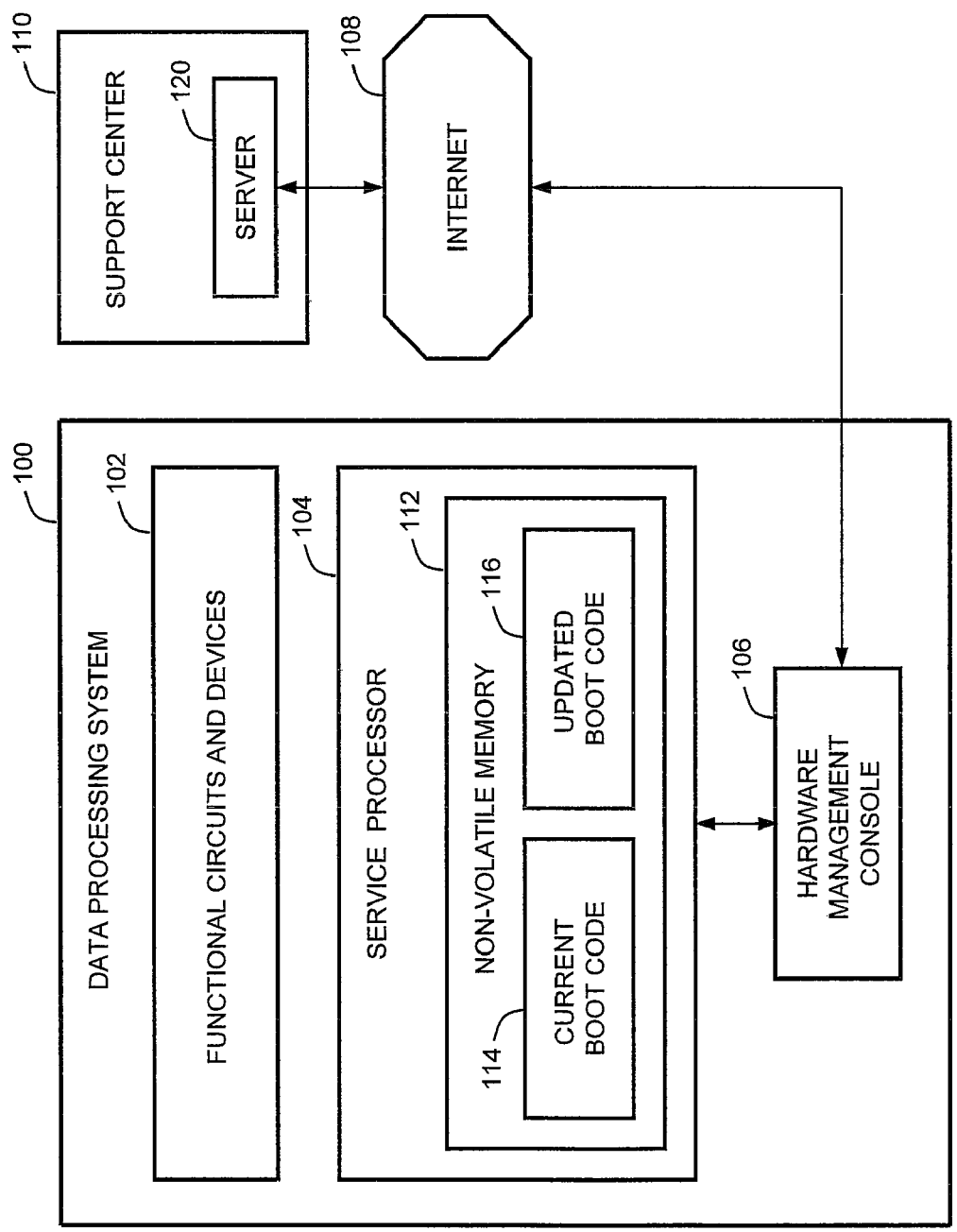
FIG. 1 is a block diagram of a data processing system in which a preferred embodiment of the present invention is incorporated.

With reference now to the drawings, and in particular to FIG. 1, there is illustrated a block diagram of a data processing system in which a preferred embodiment of the present invention is incorporated. As shown, a data processing system 100 includes a service processor 104, a hardware management console (HMC) 106, and various functional circuits and devices collectively denoted under a block 102. Service processor 104 is configured for booting up data processing system 100. The boot code for booting up data processing system 100 is stored in a non-volatile memory 112 having a first memory region 114 and a second memory region 116. For the present embodiment, non-volatile memory 112 is located within service processor 104, and can be implemented with, for example, a flash memory. Contents of non-volatile memory 112 are preserved even when no power is being applied.

HMC 106 supervises system management tasks in data processing system 100. HMC 106 is preferably a computer that is capable of executing an embedded HMC software. HMC 106 may be connected to a server 120 located within a user support center 110 via Internet 108.

User support center 110 is operated by an entity that provides support for hardware and software components of client data processing systems such as data processing system 100. User support center 110 may provide software updates to data processing system 100 via HMC 106. For the present embodiment, communications between user support center 110 and HMC 106 are performed via server 120 located within user support center 110.

Within non-volatile memory 112 of service processor 104, first memory region 114 contains a current version of the boot code for booting up data processing system 100, and second memory region 116 contains an update revision of the boot code for booting up data processing system 100. During operation, HMC 106 periodically downloads the latest version of the boot code from server 120 located within user support center 110, and then updates the boot code stored in second memory region 116 by replacing the boot code stored in second memory region 116 with the latest version of the boot code downloaded from server 120.

An initial program load occurs when data processing system 100 is being booted up. During the initial program load, the current boot code stored in first memory region 114 is being executed by service processor 104. After service processor 104 completes the initialization of all the devices and components within data processing system 100, a hypervisor software (i.e., a layer of software that is typically executed between the operating system and hardware) is loaded into a system memory (not shown), and the hypervisor then takes control over data processing system 100.

Figure 2:
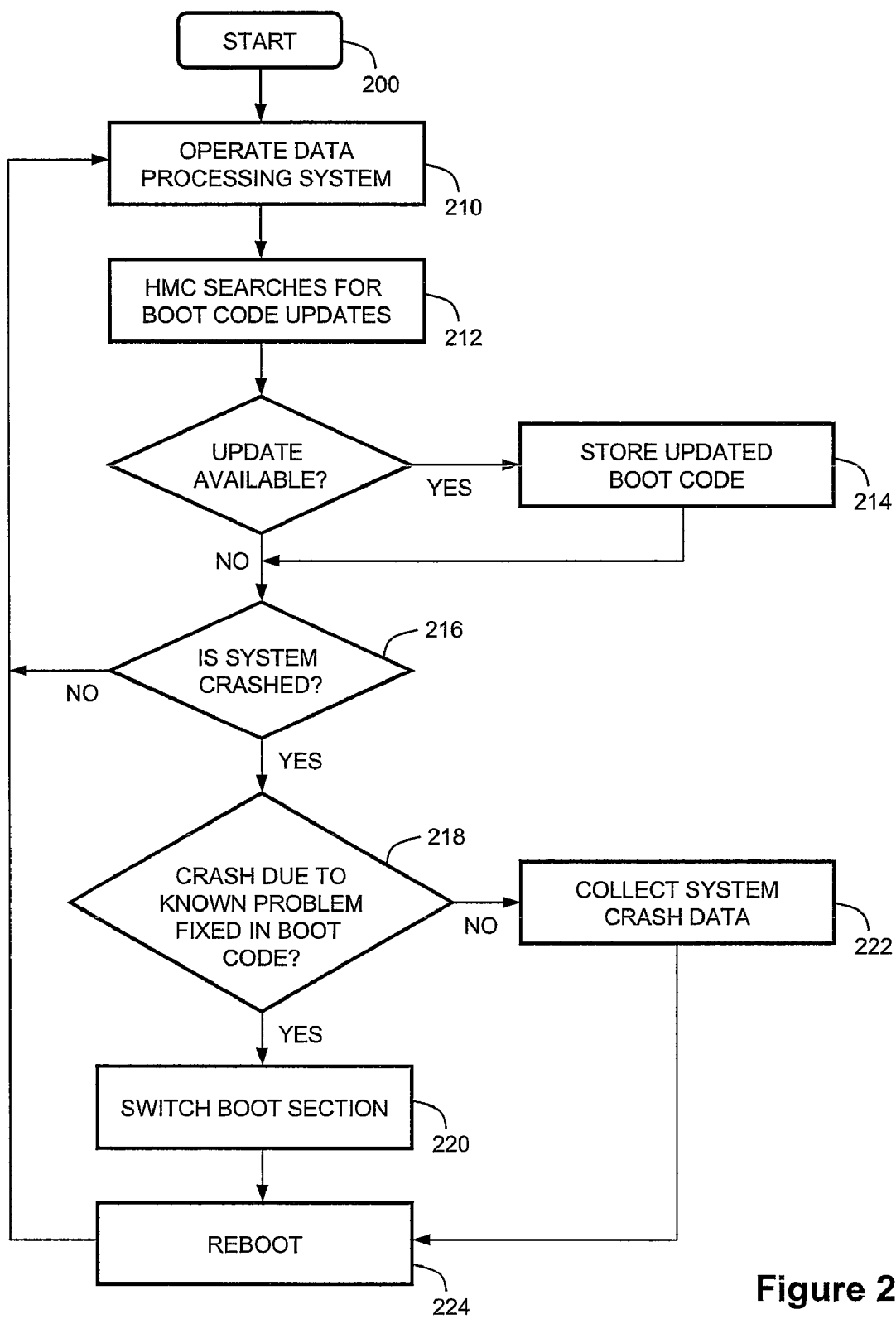
FIG. 2 is a high-level logic flow diagram of a method for recovering from software and/or hardware failures occurred in the data processing system from FIG. 1, in accordance with a preferred embodiment of the present invention.

With reference now to FIG. 2, there is depicted a high-level logic flow diagram of a method for recovering from software and/or hardware failures occurred in data processing system 100 from FIG. 1, in accordance with a preferred embodiment of the present invention. Starting at block 200, during normal system operation, data processing system 100 is being operated under the control of the hypervisor software, as shown in block 210. HMC 106 then checks with user support center 110 (from FIG. 1) to determine whether or not a newer version of the boot code for data processing system 100 is available, as depicted in block 212.

If a newer version (i.e., a version newer than the boot code stored in non-volatile memory 112 from FIG. 1) of the boot code for data processing system 100 is available from user support center 110, the newer version of the boot code is downloaded from user support center 110 to service processor 104, and the newer version of the boot code is stored in second memory region 116 of non-volatile memory 112, as shown in block 214. Basically, every time when a newer version of the boot code becomes available from user support center 110, a preceding version of the boot code in second memory region 116 is replaced by the newer version of the boot code.

Otherwise, if a newer version of the boot code for data processing system 100 is not available from user support center 110, a determination is made whether or not a system crash has occurred in data processing system 100, as depicted in block 216.

If there is no system crash, the process proceeds back to block 210. However, if a system crash has occurred, a determination is made whether or not the system crash is caused by a known problem that can be remedied by the newer version of the boot code stored in second memory region 116 of non-volatile memory 112, as shown in block 218.

If the system crash is caused by a known problem that can be remedied by the newer version of the boot code, the boot section is switched from first memory region 114 of non-volatile memory 112 to second memory region 116 of non-volatile memory 112, as depicted in block 220, and a system re-boot is performed on data processing system 100, as shown in block 224, using the updated boot code stored in second memory region 116 of non-volatile memory 112.

However, if the system crash is not caused by a known problem, or if the system crash cannot be remedied by the newer version of the boot code, data related to the system crash are collected, as depicted in block 222, and a system re-boot is performed on data processing system 100, as shown in block 224, using the current boot code stored in first memory region 114 of non-volatile memory 112. The data related to the system crash can be subsequently utilized to find out the actual cause of the system failure such that "fixes" may be incorporated in a future version of the boot code. After the system re-boot has been completed, the process returns to block 210 for normal system operation.

As has been described, the present invention provides an improved method for recovering from software and/or hardware failures occurred in a data processing system.

While an illustrative embodiment of the present invention has been described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for recovering from failures occurred in a data processing system, said method comprising:
    storing a current version of boot code in a first memory region of a non-volatile memory, and an updated version of boot code in a second memory region of said non-volatile memory;
    after an occurrence of a system crash, determining whether or not said system crash was caused by a known problem that can be remedied by said updated version of boot code;
    in a determination that said system crash was caused by a known problem that can be remedied by said updated version of boot code, rebooting said data processing system using said updated version of boot code stored in said second memory region of said non-volatile memory; and
    in a determination that said system crash was not caused by a known problem that can be remedied by said updated version of boot code, collecting data related to said system crash and rebooting said data processing system using said current version of boot code stored in said first memory region of said non-volatile memory.

2. The method of claim 1, wherein said method further includes periodically replacing said updated version of boot code with a newer version of boot code downloaded from a server located within a support center.

3. The method of claim 2, wherein said method further includes periodically checking for said updated version of boot code from said server located within said support center.

4. A computer storage medium having a computer program product for recovering from failures occurred in a data processing system, said computer storage medium comprising:
    computer program code for storing a current version of boot code in a first memory region of a non-volatile memory, and an updated version of boot code in a second memory region of said non-volatile memory;
    computer program code for, after an occurrence of a system crash, determining whether or not said system crash was caused by a known problem that can be remedied by said updated version of boot code;
    computer program code for, in a determination that said system crash was caused by a known problem that can be remedied by said updated version of boot code, rebooting said data processing system using said updated version of boot code stored in said second memory region of said non-volatile memory; and
    computer program code for, in a determination that said system crash was not caused by a known problem that can be remedied by said updated version of boot code, collecting data related to said system crash and rebooting said data processing system using said current version of boot code stored in said first memory region of said non-volatile memory.

5. The computer storage medium of claim 4, wherein said computer storage medium further includes computer program code for periodically replacing said updated version of boot code with a newer version of boot code downloaded from a server located within a support center.

6. The computer storage medium of claim 5, wherein said computer storage medium further includes computer program code for periodically checking for said updated version of boot code from said server located within said support center.

7. A data processing system comprising:
    a first memory region of a non-volatile memory for storing a current version of boot code;
    a second memory region of said non-volatile memory for storing an updated version of boot code;
    means for, after an occurrence of a system crash, determining whether or not said system crash was caused by a known problem that can be remedied by said updated version of boot code;
    means for, in a determination that said system crash was caused by a known problem that can be remedied by said updated version of boot code, rebooting said data processing system using said updated version of boot code stored in said second memory region of said non-volatile memory; and means for, in a determination that said system crash was not caused by a known problem that can be remedied by said updated version of boot code, collecting data related to said system crash and rebooting said data processing system using said current version of boot code stored in said first memory region of said non-volatile memory.

8. The data processing system of claim 7, wherein said data processing system further includes means for periodically replacing said updated version of boot code with a newer version of boot code downloaded from a server located within a support center.

9. The data processing system of claim 8, wherein said data processing system further includes a hardware management console for periodically checking for said updated version of boot code from said server located within said support center.

* * * * *